United States Patent
Surnilla et al.

(10) Patent No.: US 10,408,152 B1
(45) Date of Patent: Sep. 10, 2019

(54) METHODS AND SYSTEM FOR ADJUSTING CYLINDER AIR CHARGE OF AN ENGINE

(71) Applicant: Ford Global Technologies, LLC, Dearborn, MI (US)

(72) Inventors: Gopichandra Surnilla, West Bloomfield, MI (US); Christopher Glugla, Macomb, MI (US); Garlan Huberts, Milford, MI (US); Adithya Pravarun Re Ranga, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/902,980

(22) Filed: Feb. 22, 2018

(51) Int. Cl.
*F02D 41/18* (2006.01)
*F02D 41/06* (2006.01)
*G01F 1/88* (2006.01)
*F02P 5/04* (2006.01)
*F02D 11/10* (2006.01)

(52) U.S. Cl.
CPC ......... *F02D 41/182* (2013.01); *F02D 41/062* (2013.01); *F02P 5/045* (2013.01); *G01F 1/88* (2013.01); *F02D 11/106* (2013.01); *F02D 2200/0404* (2013.01); *F02D 2200/0406* (2013.01); *F02D 2200/0414* (2013.01)

(58) Field of Classification Search
CPC ............... F02D 41/182; F02D 41/062; F02D 2200/0404; F02D 2200/0414; F02D 11/106; F02D 2200/0406; F02P 5/045; G01F 1/88
See application file for complete search history.

(56) References Cited

U.S. PATENT DOCUMENTS

| | | | |
|---|---|---|---|
| 4,622,939 | A | 11/1986 | Matekunas |
| 4,744,244 | A | 5/1988 | Tanaka |
| 5,878,717 | A | 3/1999 | Zur Loye |
| 7,021,287 | B2 | 4/2006 | Zhu et al. |
| 7,032,581 | B2 | 4/2006 | Gibson et al. |
| 7,201,127 | B2 | 4/2007 | Rockwell et al. |

OTHER PUBLICATIONS

Pettersson, P. et al., "Torque estimation from in-cylinder pressure sensor for closed loop torque control," Master's Thesis EX051/2017, Chalmers University of Technology, Department of Signals and Systems, Jun. 2017, Gothenburg, Sweden, 57 pages.

*Primary Examiner* — Xiao En Mo

(74) *Attorney, Agent, or Firm* — Julia Voutyras; McCoy Russell LLP

(57) ABSTRACT

Systems and methods for operating an internal combustion engine based on output of an intake manifold pressure sensor and output of an in cylinder pressure sensor are described. The systems and methods provide a way of determining cylinder air charge so that a fuel injector has sufficient time to provide a desired amount of fuel to a cylinder during a cycle of the cylinder.

14 Claims, 6 Drawing Sheets

CYLINDER
AIR CHARGE SCALARS

First to fire cylinder

|   | 1 | 2 | 3 | 4 |
|---|---|---|---|---|
| 1 | $\alpha_{11}$ | $\alpha_{12}$ | $\alpha_{13}$ | $\alpha_{14}$ |
| 2 | $\alpha_{21}$ | $\alpha_{22}$ | $\alpha_{23}$ | $\alpha_{24}$ |
| 3 | $\alpha_{31}$ | $\alpha_{32}$ | $\alpha_{33}$ | $\alpha_{34}$ |
| 4 | $\alpha_{41}$ | $\alpha_{42}$ | $\alpha_{43}$ | $\alpha_{44}$ |
| 5 | $\alpha_{51}$ | $\alpha_{52}$ | $\alpha_{53}$ | $\alpha_{54}$ |
| 6 | $\alpha_{61}$ | $\alpha_{62}$ | $\alpha_{63}$ | $\alpha_{64}$ |
| 7 | $\alpha_{71}$ | $\alpha_{72}$ | $\alpha_{73}$ | $\alpha_{74}$ |
| 8 | $\alpha_{81}$ | $\alpha_{82}$ | $\alpha_{83}$ | $\alpha_{84}$ |
| 9 | $\alpha_{91}$ | $\alpha_{92}$ | $\alpha_{93}$ | $\alpha_{94}$ |

Firing Event Since Most recent Engine stop

FIG. 2

METHODS AND SYSTEM FOR ADJUSTING CYLINDER AIR CHARGE OF AN ENGINE

FIELD

The present description relates to methods and a system for determining air charge amounts of an internal combustion engine that includes direct fuel injectors. The methods and systems may be particularly useful for engines that include an intake manifold pressure sensor and one or more cylinder pressure sensors.

BACKGROUND AND SUMMARY

An internal combustion engine may include direct fuel injectors for supplying fuel directly to engine cylinders. The direct fuel injectors may be sized so that they may accurately provide either small or large amounts of fuel to a cylinder during a cycle of the cylinder. However, to provide large amounts of fuel to the cylinder to meet driver demand torque, the direct fuel injectors may have to begin injecting fuel before intake valves of the cylinder close so that a desired amount of fuel may be injected to the cylinder. If intake manifold pressure is sampled long before the cylinder's intake valve closes, the intake manifold pressure may not be indicative of air charge in the cylinder, especially during engine starting when intake manifold pressure changes significantly in a short period of time. Consequently, basing an amount of fuel injected to a cylinder solely off of intake manifold pressure before intake valve closing of the cylinder may yield an air-fuel ratio in the cylinder that deviates from a desired air-fuel ratio of the cylinder. Further, spark timing for the cylinder may deviate from desired spark timing due to errors in the cylinder air charge estimate.

The inventors herein have recognized the above-mentioned issues and have developed an engine operating method, comprising: injecting a first amount of fuel to a cylinder during the cycle of the cylinder in response to an open loop estimate of cylinder air charge, the open loop estimate of cylinder air charge a function of a first cylinder to fire since a most recent engine stop and an actual total number of combustion events since the most recent engine stop.

By adjusting a cylinder air charge estimate as a function of the first cylinder to fire since a most recent engine stop and an actual total number of combustion events since the most recent engine stop, it may be possible to provide the technical result of improving engine air-fuel control. In particular, the inventors herein have recognized that an observation of cylinder air charge from a previous engine start may be the basis for changing a cylinder air charge estimate for a present engine start. A cylinder air charge estimate that is determined during a prior engine start and that is based on pressure in a cylinder corresponding to a particular first cylinder to fire and an actual total number of combustion events since a most recent engine stop may be the basis for updating a cylinder air charge estimate that is based on engine intake manifold pressure during a present engine start. A cylinder air charge estimate that is determined in a present engine start and that is based on cylinder pressure may provide a cylinder air charge estimate that includes effects of intake manifold air flow characteristics and cylinder head air flow characteristics during engine starting. The cylinder air charge estimate determined during a previous engine start and that is based on cylinder pressure may also be the basis for adjusting a cylinder air charge estimate that is based on intake manifold pressure for a present engine start. The cylinder air charge estimate determined during a previous engine start may modify the cylinder air charge estimate that is based on intake manifold pressure during the present engine start for the effects of intake manifold air flow characteristics and cylinder head air flow characteristics. In this way, the cylinder air charge estimate that is based on intake manifold pressure and that is determined during a present engine start may be adjusted closer to the actual amount of air in a cylinder for the present engine start. Therefore, fuel injection may be initiated earlier in a cylinder cycle based on an improved cylinder air charge estimate so that a desired amount of fuel may be injected during the cylinder cycle.

The present description may provide several advantages. Specifically, the approach may provide improved engine air-fuel ratio control. Further, the approach may provide for more repeatable engine starting. Further still, the approach may improve engine starting no matter which engine cylinder is first to fire after a most recent engine stop.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 2 shows an example table of cylinder air charge scalars;

DETAILED DESCRIPTION

Figure 3:
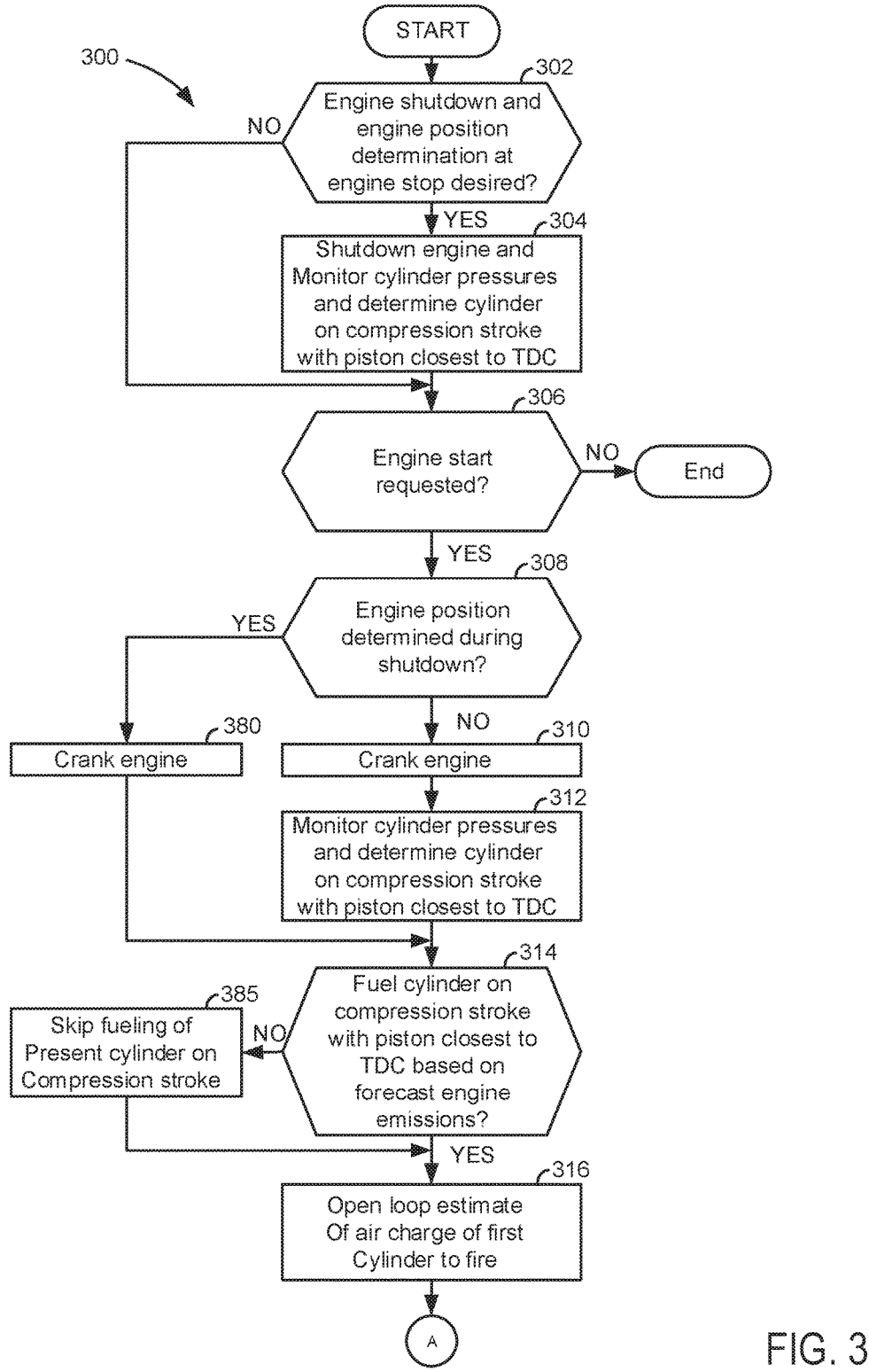
FIGS. 3-5 shows an example flowchart of a method of operating an engine.
Figure 4:
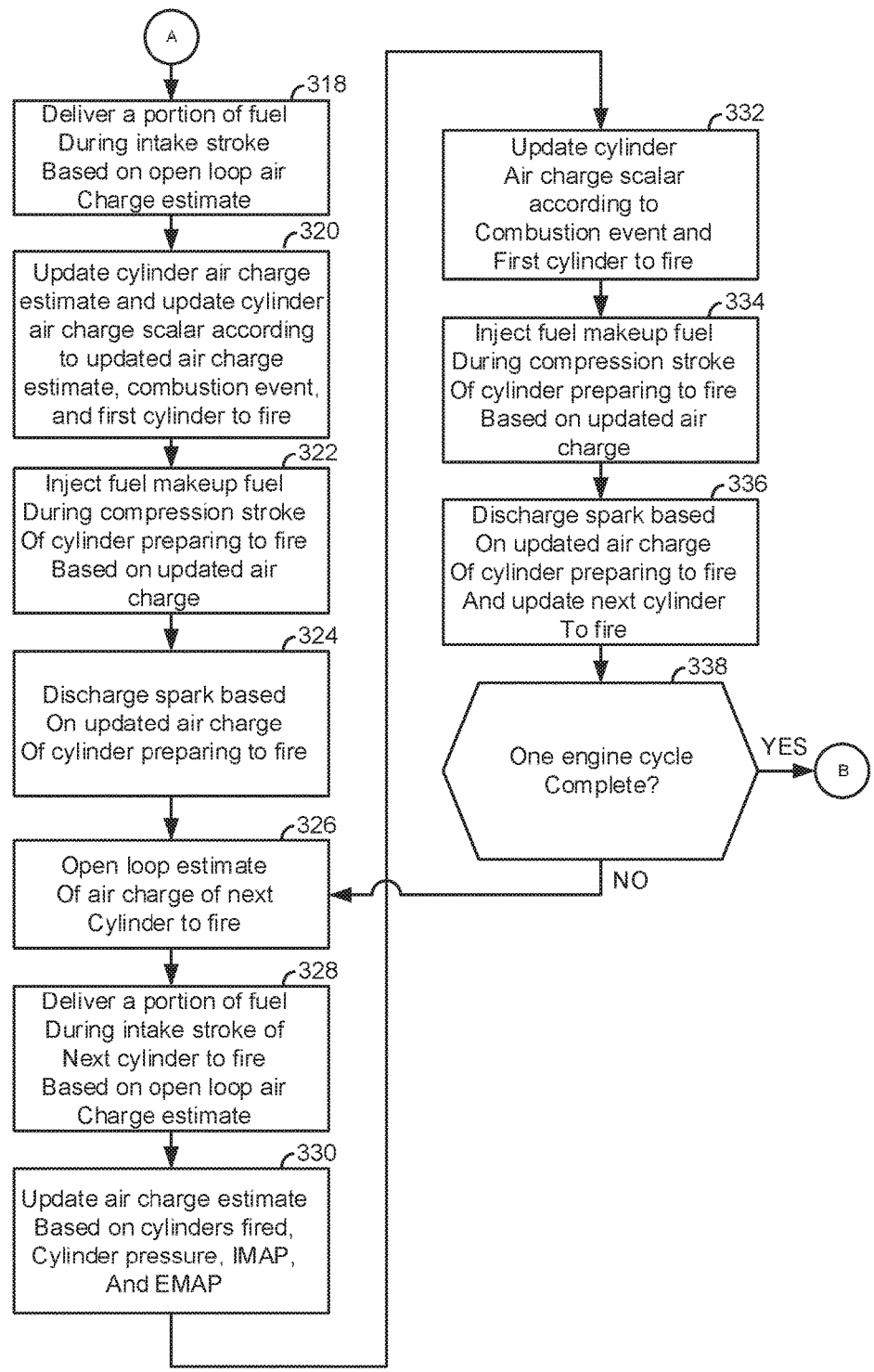
Figure 5:
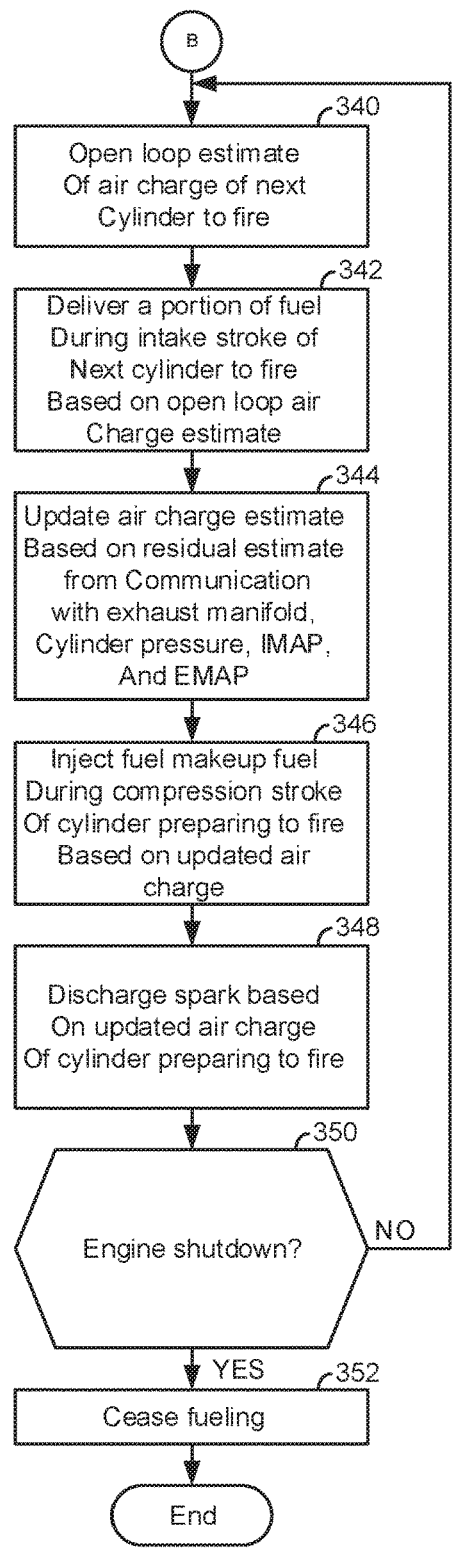
Figure 6:
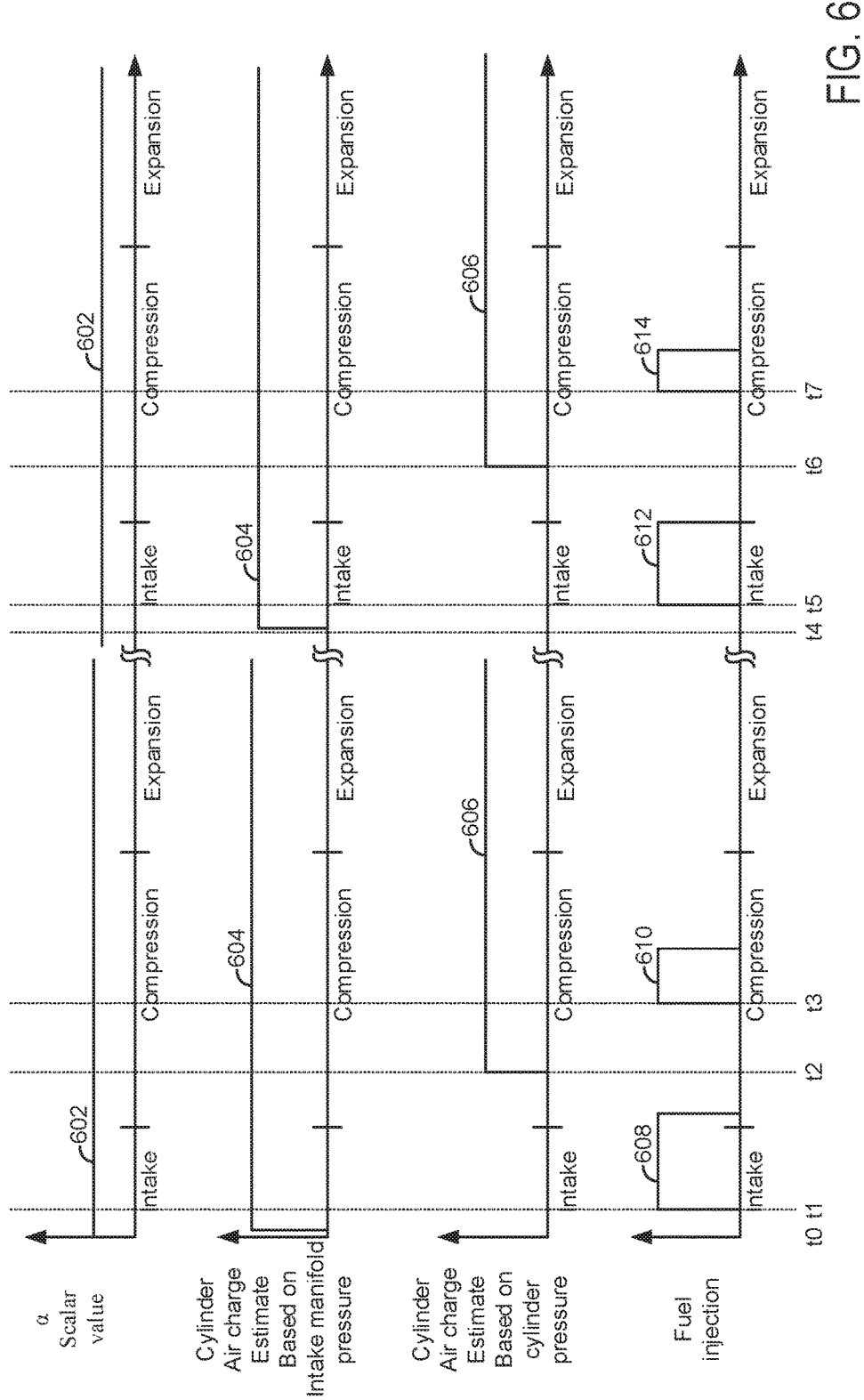
FIG. 6 is a plot of two engine starting sequences.

The present description is related to adjusting cylinder air charge estimates to improve engine starting and air-fuel ratio control during engine starting. Fuel may be injected to an engine in response to two different cylinder air charge estimates for a cylinder cycle. The fuel may be injected in a first fuel pulse that occurs during an intake stroke of a cylinder. Fuel may also be injected in a second fuel pulse that occurs during a compression stroke of the cylinder. The cylinder air charge may be estimated for an engine of the type shown in FIG. 1. Cylinder charge estimates from prior engine starts may be the basis for changing values of cylinder air charge scalars that are a function of first cylinder to fire since engine stop and an actual total number of combustion events since engine stop. FIGS. 3-5 illustrate a method for operating an engine. A portion of an example engine starting sequence is shown in FIG. 6.

Figure 1:
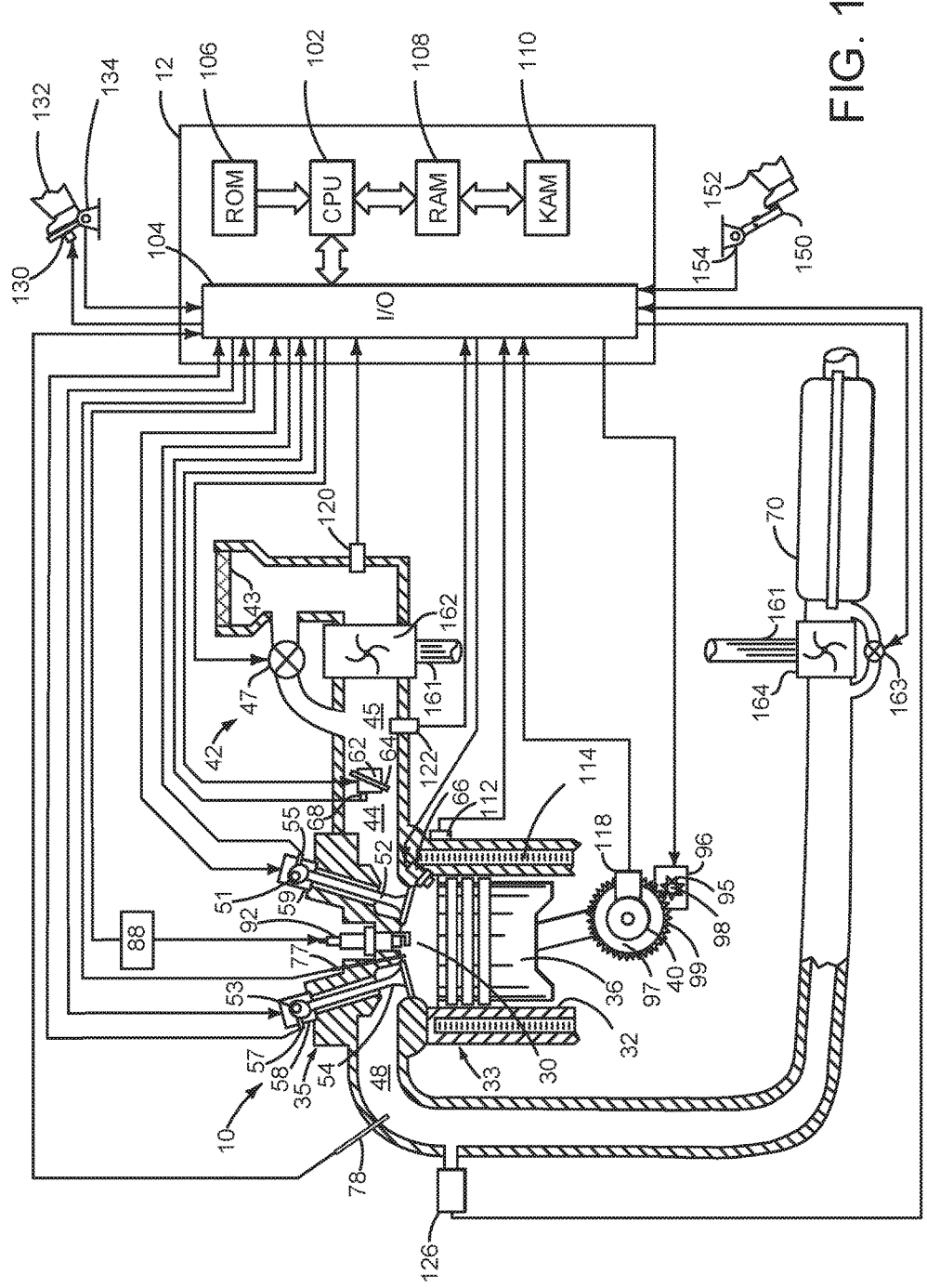
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Wastegate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Pressure in combustion chamber or cylinder 30 may be determined via cylinder pressure sensor 77. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126. Exhaust pressure in exhaust manifold 48 may be determined via pressure sensor 78.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

The system of FIG. 1 provide for a vehicle system, comprising: an engine; an intake manifold pressure sensor coupled to the engine; an cylinder pressure sensor coupled to the engine and partially within a cylinder of the engine; and a controller including executable instructions stored in non-transitory memory to: provide a first injection of fuel to the cylinder of the engine during a cycle of the cylinder in response to output of the intake manifold pressure sensor during the cycle of the cylinder; and provide a second injection of fuel to the cylinder during the cycle of the cylinder in response to output of the cylinder pressure sensor. The system further comprises additional instructions to estimate cylinder air charge via the intake manifold pressure sensor. The system further comprises additional instructions to estimate cylinder air charge via the cylinder pressure sensor. The system includes where injecting fuel to the cylinder of the engine during the cycle of the cylinder in response to output of the intake manifold pressure sensor includes injecting fuel during an intake stroke of the cylinder via a direct fuel injector. The system includes where injecting fuel to the cylinder of the engine during the cycle of the cylinder in response to output of the cylinder pressure sensor includes injecting fuel during a compression stroke of the cylinder via a direct fuel injector. The system further comprises additional instructions to adjust spark timing in response to output of the cylinder pressure sensor during the cylinder cycle.

FIG. 2 shows a table 200 of cylinder air charge scalars. Table 200 may be included in memory (e.g., non-transitory or transitory) of controller 12 shown in FIG. 1. In this example, table 200 includes nine rows (1-9) and four columns (1-4). Table 200 may be applied in a system with a four cylinder engine having cylinders 1-4. Of course, tables having greater dimensions than 9×4 are anticipated for systems that include greater number of cylinders or where it may be desirable to compensate for more than nine combustion events. The rows represent cylinder combustion events since the most recent engine stop (e.g., rotational speed of the engine is zero). Cylinder combustion events are combustion occurrences in engine cylinders where combustion is initiated in the cylinders via supplying air, fuel, and spark to the cylinders. For example, a first combustion event since a most recent engine stop may occur in a cylinder that is first cylinder that is supplied air, fuel, and spark to ignite an air fuel mixture in the first cylinder since the most recent engine stop. A second combustion event since a most recent engine stop may occur in a cylinder that is second cylinder to receive air, fuel, and spark to ignite an air fuel mixture in the second cylinder after the most recent engine stop.

The columns represent a number of a first cylinder to fire since the most recent engine stop. For example, if cylinder number three is a first cylinder to receive air, fuel, and spark since a most recent engine stop, then cylinder number three may be the first cylinder to fire since the most recent engine stop. The first cylinder to fire may be based on engine stopping position and other considerations. In some examples, the first cylinder to fire may be a cylinder that is on its intake stroke with its piston closest to a crankshaft location where the cylinder's intake valves close. The first cylinder to fire may vary from start to start and the criteria for selecting the first cylinder to fire since a most recent engine stop may also vary depending on engine operating conditions.

The first row is identified as 202 and the ninth row is identified as 204. The first column is identified as 206 and the fourth column is identified as 208. Each row/column pair holds a cylinder air charge scalar $\alpha_{xy}$, where x indicates the row number and y indicates the column number of table 200. Thus, $\alpha_{11}$ represents a cylinder air charge scalar for a first combustion event since a most recent engine stop where cylinder number one is the first cylinder to fire since the most recent engine stop. Scalar $\alpha_{11}$ is applied by multiplying it and an estimate of cylinder air charge for cylinder number one when cylinder number one is going to be the first cylinder to fire (e.g., combust air and fuel) since a most recent engine stop. Similarly, Scalar $\alpha_{93}$ is applied by multiplying an estimate of cylinder air charge for cylinder number three when cylinder number three is going to be the ninth cylinder to combust air and fuel since a most recent engine stop. The $\alpha$ values are adjusted based on data from past engine starts as will be explained in further detail in the method of FIGS. 3-5. Thus, for each cylinder firing event since a most recent engine start, the cylinder air charge may be adjusted responsive to cylinder air charge amounts inducted during prior engine starts. This allows the individual cylinder air charge amounts to be individually adjusted based on the firing event from the most recent engine stop. This may allow the cylinder air charge amounts of the individual cylinders to be compensated for engine intake manifold air flow dynamics and cylinder head air flow dynamics during an engine start. Further, for each cylinder firing event since the most recent engine start, the cylinder air amounts may be adjusted according to which engine cylinder fired first after the most recent engine stop so that changes in pressure that may propagate through the engine intake manifold and that may affect the air charges of other cylinders. For example, if cylinder number one of a four cylinder engine is a first cylinder to induct air and fire after a most recent engine stop, then cylinder air charge of cylinder number three (the next cylinder in the engine firing order of 1-3-4-2) may be affected by cylinder number one inducting air before cylinder number three and the air flow dynamics of cylinder number three. Consequently, scalar $\alpha_{21}$ may modify the air charge amount of cylinder number three when cylinder number three is the second cylinder to fire (e.g., combust air and fuel) since the most recent engine stop.

Referring now to FIGS. 3-5, a flowchart for operating a hybrid vehicle is shown. At least portions of the method of FIGS. 3-5 may be incorporated as executable instructions stored in non-transitory memory of the system shown in FIG. 1. Additionally, portions of the method of FIGS. 3-5 may take place in the physical world as operations or actions performed by a controller to transform an operating state of one or more devices. Some of the control parameters described herein may be determined via controller 12 receiving input from the sensors and actuators described previously. The method of FIGS. 3-5 may also provide the operating sequence shown in FIG. 6.

At 302, method 300 judges if engine shutdown and engine position determination at engine stop (e.g., zero engine rotation) is desired. In one example, engine shutdown and engine position determination at engine stop is desired if a human driver initiated engine stop or automatic engine stop (e.g., an engine stop that is requested via a controller in response to operating conditions of a vehicle) is requested. If method 300 judges that engine shutdown and engine position determination at engine stop is desired, the answer is yes and method 300 proceeds to 304. Otherwise, the answer is no and method 300 proceeds to 306.

At 304, method 300 ceases spark and fuel delivery to engine cylinders. Method 300 also monitors pressures in each engine cylinder and engine position as the engine decelerates to zero speed. Method 300 tracks the present stroke and piston position of each cylinder up to an including at engine stop. Method 300 stores the engine position and stroke data to controller memory. Method 300 proceeds to 306.

At 306, method 300 judges if an engine start is requested. An engine start may be requested via a human supplying input to a human/machine interface or via a controller requesting an automatic engine start without a human expressly requesting an engine start. If method 300 judges that an engine start is requested, the answer is yes and method 300 proceeds to 308. Otherwise, the answer is no and method 300 proceeds to exit.

At 308, method 300 judges if engine position was determined at engine shutdown. Method 300 may judge that engine position was determined at engine shutdown via values stored in controller memory. If controller memory included engine position data determined at engine shutdown, the answer is yes and method 300 proceeds to 380. Otherwise, the answer is no and method 300 proceeds to 310.

At 380, method 300 cranks the engine (e.g., rotates the engine via an electric machine) to start the engine. The engine may be cranked via a starter, an integrated starter/generator, or via an electric machine in the vehicle driveline. Method 300 proceeds to 314.

At 310, method 300 cranks the engine (e.g., rotates the engine via an electric machine) to start the engine. The engine may be cranked via a starter, an integrated starter/generator, or via an electric machine in the vehicle driveline. Method 300 proceeds to 312.

At 312, method 300 monitors pressures in each engine cylinder and engine position as the engine is cranked. Method 300 determines engine position from the crankshaft position sensor and via cylinder pressure sensor output. For example, method 300 may judge that a cylinder is on an intake stroke if pressure in the cylinder pressure is not decreasing or is decreasing at a rate that is less than a threshold while a piston of the cylinder is moving away from top-dead-center as the engine rotates while it is being cranked. Specifically, method 300 determines which cylinder has its piston closest to bottom-dead-center intake stroke as the engine is cranked via cylinder pressure sensor and the engine crankshaft position sensor. Method 300 proceeds to 314.

At 314, method 300 judges if it is desirable to fuel the cylinder closest to bottom-dead-center intake stroke based on forecast emissions. In one example, engine emissions (e.g., HC, NOx, and CO) are stored in controller memory and they are stored based on the first cylinder to fire (e.g., combust air and fuel). The engine may produce higher emissions when the first cylinder to fire is a particular cylinder and when the position of the particular cylinder's piston is closer to bottom-dead-center intake stroke, which may be due to reduced fuel vaporization in the cylinder and fuel accumulating in crevasses and gaps within the cylinder (e.g., space between the cylinder wall and the piston). If the cylinder on its intake stroke with its piston being the closest piston to bottom-dead-center is forecast to produce engine emissions that are greater than a threshold amount of emissions, then the answer is no and method 300 proceeds to 385. Otherwise, the answer is yes and method 300 proceeds to 316.

At 385, method 300 does not provide fuel to the cylinder that is presently on its intake stroke with the cylinder's piston being the closest of engine pistons to bottom-dead-center intake stroke. Thus, method 300 skips firing the cylinder that is presently on its intake stroke with the cylinder's piston being the closest of engine pistons to bottom-dead-center intake stroke so that engine emissions may be reduced. Method 300 selects the cylinder next in the order of combustion as the first cylinder to fire since the most recent engine stop. For example, if the engine is a four cylinder, four stroke engine, having a firing order of 1-3-4-2, and cylinder number one is presently on its intake stroke, but engine emissions may be high for cylinder number one, then cylinder number three is selected as the first cylinder to fire since the most recent engine stop. Method 300 proceeds to 316.

At 316, method 300 determines an open-loop cylinder air charge estimate for the cylinder selected to first to fire from the most recent engine stop. Method 300 determines the cylinder air charge according to the following equation:

$$Mai = \frac{P_i V}{RT} \cdot \alpha_{xy}$$

where Mai is the mass of air in the cylinder as determined during the intake stroke of the first cylinder selected to fire, $P_i$ is the intake manifold pressure during the intake stroke of the first cylinder selected to fire, V is the volume of the first cylinder selected to fire, R is a gas constant, T is the temperature in the cylinder, and a is the cylinder air charge scalar described in the explanation of FIG. 2. The value of a is extracted from controller memory and its value was determined from cylinder air charge data determined during a past engine start where engine operating conditions were substantially the same (e.g., same engine temperature) as is described at 320. The Mai estimate allows fuel to be injected early in the cylinder cycle so that a desired amount of fuel may be injected to the cylinder. Method 300 proceeds to 318.

At 318, method 300 delivers a portion of fuel to be delivered to the first cylinder to fire during the cycle of the first cylinder to fire based on the open-loop cylinder air charge amount determined at 316 and a desired air-fuel ratio for the engine. In one example, method 300 determines the amount of fuel to inject to the first cylinder to fire since the most recent engine stop via the following equation:

$$Mfi = Mai \cdot FAR \cdot DISFF$$

where Mfi is the mass of fuel to be injected during the intake stroke of the first cylinder selected to combust, Mai is the mass of air in the cylinder as determined during the intake stroke of the first cylinder selected to fire, FAR is a desired fuel air ratio (e.g., 1:15), and DISFF is a desired fuel fraction for the intake stroke (e.g., a value of 0.75 will cause the amount of fuel injected to be 75% of the mass of air estimated in the cylinder multiplied by the fuel-air ratio to be injected to the cylinder). DISFF may be restricted to a value of less than one so that less fuel than is expected to meet the desired fuel-air ratio is injected to the cylinder. The value of DISFF allows additional fuel to be injected during the cylinder compression stroke to correct for air charge estimate errors to be compensated by adding additional fuel to the first cylinder to fire since the most recent engine stop. The engine continues to be cranked while fuel is injected during the intake stroke of the first cylinder to fire since the most recent engine stop. Method 300 proceeds to 320.

At 320, method 300 updates the cylinder air charge estimate of the first cylinder to be fired since the most recent engine stop. The cylinder air charge estimate is updated according to the following equation:

$$Mac = \frac{P_c V}{RT}$$

where Mac is the mass of air in the cylinder as determined during the compression stroke of the first cylinder selected to fire, $P_c$ is the pressure in the first cylinder selected to fire during the cylinder's compression stroke, V is the volume of the cylinder at the time the pressure is determined, R is a gas constant, and T is the temperature in the cylinder. Cylinder temperature may be inferred from intake air temperature and engine coolant temperature. Pressure in the first cylinder to fire or combust air and fuel since the most recent engine stop is determined via the cylinder pressure sensor after the intake valve of the first cylinder to fire after the most recent engine stop closes. The cylinder volume is determined based on engine position and engine displacement. The Mac estimate allows for a second injection of fuel into the cylinder that may be based on a more accurate estimate of cylinder air amount.

In addition, method 300 determines an adjustment to the value of a that corresponds to the first firing event of the cylinder selected to be the first cylinder to fire since the most recent engine stop. In one example, if the value of Mac−Mai is greater than a threshold value, the value of a is increased by a predetermined amount (e.g., 0.005). If the value of Mac−Mai is less than a threshold value, the value of $\alpha_{xy}$ is decreased by a predetermined amount (e.g., 0.005). The updated value of $\alpha_{xy}$ is stored in controller memory for a subsequent engine start. The initial value of each α may be equal to one. The adjusted $\alpha_{xy}$ value is stored to memory at a location dependent or based on the first combustion event since a most recent engine stop (x) and first cylinder selected to fire (y). Method 300 proceeds to 322.

At 322, method 300 delivers makeup fuel to the first cylinder selected to fire (e.g., fuel that provides the desired fuel-air ratio (FAR) in the first cylinder to fire). In particular, method 300 delivers a portion of fuel to be delivered to the first cylinder to fire during the cycle of the first cylinder to fire based on the cylinder air charge amount determined at 320 and the desired air-fuel ratio for the engine. In one example, method 300 determines the amount of fuel to inject to the first cylinder to fire since the most recent engine stop via the following equation:

$$Mfc = ((Mac - Mai) \cdot FAR) + ((Mai \cdot FAR) \cdot (1 - DISFF))$$

where Mfc is the mass of fuel to be injected during the compression stroke of the first cylinder selected to fire, Mac is mass of air in the first cylinder selected to fire as determined via cylinder pressure, Mai is the mass of air in the cylinder as determined during the intake stroke of the first cylinder selected to fire, FAR is a desired fuel air ratio (e.g., 1:15), and DISFF is a desired fuel fraction for the intake stroke (e.g., a value of 0.75 will cause the amount of fuel injected to be 75% of the mass of air estimated in the cylinder multiplied by the fuel-air ratio to be injected to the cylinder). Injecting the balance of fuel for the first combustion event of the engine during the compression stroke of the first cylinder selected to fire since a most recent engine stop allows the injected fuel amount to be corrected while still allowing larger amounts of fuel to enter the engine cylinder since cylinder air charge values may be high during engine starting. Method 300 proceeds to 324.

At 324, method 300 discharges spark in the first cylinder to fire since the most recent engine stop. The spark timing is adjusted as a function of the cylinder air charge determined from pressure in the first cylinder to fire. For example, spark timing may be determined via the following equation:

$$SAF = f(N, Mac)$$

where SAF is the spark timing, N is engine speed, and Mac is the cylinder air charge based on pressure in the first cylinder to fire. Note that in some examples, a cylinder load value based on Mac may be substituted for Mac. Method 300 proceeds to 326.

At 326, method 300 determines an open-loop cylinder air charge estimate for the next cylinder in the order of combustion. For example, if open-loop cylinder air charge was determined for cylinder number 2 of an engine having a firing order of 1-3-4-2, then the next cylinder air charge estimate is for cylinder number one. Method 300 determines the cylinder air charge according to the following equation:

$$Mai = \frac{P_i V}{RT} \cdot \alpha_{xy}$$

where Mai is the mass of air in the next cylinder to fire as determined during the intake stroke of the next cylinder selected to fire, $P_i$ is the intake manifold pressure during the intake stroke of the next cylinder selected to fire, V is the volume of the next cylinder selected to fire, R is a gas constant, T is the temperature in the cylinder, and $\alpha_{xy}$ is the cylinder air charge scalar described in the explanation of FIG. 2. The value of $\alpha_{xy}$ is extracted from memory and its value was determined from cylinder air charge data determined during a past engine start where engine operating conditions were substantially the same (e.g., same engine temperature), same actual total number of combustion events since engine start, and same first cylinder to fire at engine start. Method 300 proceeds to 328.

At 328, method 300 delivers a portion of fuel to be delivered to the next cylinder to fire during the cycle of the next cylinder to fire based on the open-loop cylinder air charge amount determined at 316 and a desired air-fuel ratio for the engine. In one example, method 300 determines the amount of fuel to inject to the next cylinder to fire since the most recent engine stop via the following equation:

$$Mfi = Mai \cdot FAR \cdot DISFF$$

where Mfi is the mass of fuel to be injected during the intake stroke of the next cylinder selected to fire or combust, Mai is the mass of air in the cylinder as determined during the intake stroke of the next cylinder selected to fire, FAR is a desired fuel air ratio, and DISFF is a desired fuel fraction for the intake stroke. DISFF may be restricted to a value of less than one so that less fuel than is expected to meet the desired fuel-air ratio is injected to the cylinder. The value of DISFF allows additional fuel to be injected during the cylinder compression stroke to correct for air charge estimate errors to be compensated by adding additional fuel to the next cylinder to fire since the most recent engine stop. Method 300 proceeds to 330.

At 330, method 300 provides a revised cylinder air charge estimate. The revised cylinder charge estimate may be expressed as:

$$Mac = f(CylN, Pc, IMAP, EMAP, Mfi, Vc, T, R)$$

where Mac is the mass of air in the cylinder as determined during the compression stroke of the next cylinder selected to fire, Pc is the pressure in the next cylinder selected to fire during the cylinder's compression stroke, Vc is the volume of the next cylinder at the time the pressure is determined, R is a gas constant, and T is the temperature in the cylinder, CylN is the actual total number of engine combustion events since the most recent engine stop, IMAP is intake manifold absolute pressure at intake valve closing time of the next cylinder, EMAP is exhaust manifold absolute pressure at exhaust valve closing time of the next cylinder, and Mfi is the mass of fuel to be injected during the intake stroke of the next cylinder selected to fire or combust. Cylinder temperature may be inferred from intake air temperature and engine coolant temperature. Pressure in the next cylinder to fire or combust air and fuel since the most recent engine stop is determined via the cylinder pressure sensor after the intake valve of the next cylinder to fire after the most recent engine stop closes. The Method 300 proceeds to 332.

At 332, method 300 may adjustment the value of $\alpha_{xy}$ that corresponds to the next firing event of the cylinder selected to be the next cylinder to fire since the most recent engine stop. In one example, if the value of Mac−Mai for the next cylinder to fire since a most recent engine stop is greater than a threshold value, the value of $\alpha_{xy}$ is increased by a predetermined amount (e.g., 0.005). If the value of Mac−Mai for the next cylinder to fire since a most recent engine stop is less than a threshold value, the value of $\alpha_{xy}$ is decreased by a predetermined amount (e.g., 0.005). The updated value of $\alpha_{xy}$ is stored in controller memory for a subsequent engine start. The adjusted $\alpha_{xy}$ value is stored to memory at a location dependent or based on the first combustion event since a most recent engine stop (x) and first cylinder selected to fire (y). Method 300 proceeds to 334.

At 334, method 300 delivers makeup fuel to the next cylinder selected to fire (e.g., fuel that provides the desired fuel-air ratio (FAR) in the cylinder. In particular, method 300 delivers a portion of fuel to be delivered to the next cylinder to fire during the cycle of the next cylinder to fire based on the cylinder air charge amount determined at 330 and the desired air-fuel ratio for the engine. In one example, method 300 determines the amount of fuel to inject to the next cylinder to fire since the most recent engine stop via the following equation:

$$Mfc = ((Mac-Mai) \cdot FAR) + ((Mai \cdot FAR) \cdot (1-DISFF))$$

where Mfc is the mass of fuel to be injected during the compression stroke of the next cylinder selected to fire, Mac is mass of air in the next cylinder selected to fire as determined via cylinder pressure, Mai is the mass of air in the cylinder as determined during the intake stroke of the next cylinder selected to fire, FAR is a desired fuel air ratio (e.g., 1:15), and DISFF is a desired fuel fraction for the intake stroke. Injecting the balance of fuel for the next combustion event of the engine during the compression stroke of the next cylinder selected to fire since a most recent engine stop allows the injected fuel amount to be corrected while still allowing larger amounts of fuel to enter the engine cylinder since cylinder air charge values may be high during engine starting. Method 300 proceeds to 336.

At 336, method 300 discharges spark in the next cylinder to fire since the most recent engine stop. The spark timing is adjusted as a function of the cylinder air charge determined from pressure in the next cylinder to fire. For example, spark timing may be determined via the following equation:

$$SAF = f(N, Mac)$$

where SAF is the spark timing, N is engine speed, and Mac is the cylinder air charge in the next cylinder to fire. Note that in some examples, a cylinder load value based on Mac may be substituted for Mac. Method 300 also updates the next cylinder to fire. For example, if the engine is a four cylinder engine with a firing order of 1-3-4-2 and cylinder number one just fired, then the next cylinder to fire is updated to cylinder number three. Method 300 proceeds to 338.

At 338, method 300 judges if one engine cycle is complete. If the engine is a four stroke engine, method judges that the engine has completed a cycle after two revolutions after the first induction of air into the first cylinder to have fired since the most recent engine stop. If method judges that one engine cycle is complete, the answer is yes and method 300 proceeds to 340. Otherwise, the answer is no and method 300 returns to 326.

At 340, method 300 determines an open-loop cylinder air charge estimate for the next cylinder in the order of combustion. Method 300 determines the cylinder air charge according to the following equation:

$$Mai = \frac{P_i V}{RT}$$

where Mai is the mass of air in the next cylinder to fire as determined during the intake stroke of the next cylinder selected to fire, $P_i$ is the intake manifold pressure during the intake stroke of the next cylinder selected to fire, V is the volume of the next cylinder selected to fire at the time the pressure is determined, R is a gas constant, T is the temperature in the cylinder, and $\alpha_{xy}$ is the cylinder air charge scalar described in the explanation of FIG. 2. Method 300 proceeds to 342.

At 342, method 300 delivers a portion of fuel to be delivered to the next cylinder to fire during the cycle of the first cylinder to fire based on the open-loop cylinder air charge amount determined at 340 and a desired air-fuel ratio for the engine as is described at 328. Method 300 proceeds to 344.

At 344, method 300 provides an updated cylinder air charge estimate. The revised cylinder charge estimate may be expressed as:

$$Mac = f(CylN, Pc, IMAP, EMAP, Mfi, Vc, T, R, CR1, CRE)$$

where Mac is the mass of air in the cylinder as determined during the compression stroke of the next cylinder selected to fire, Pc is the pressure in the next cylinder selected to fire during the cylinder's compression stroke, Vc is the volume of the next cylinder at the time the pressure is determined, R is a gas constant, and T is the temperature in the cylinder, CylN is the actual total number of engine combustion events since the most recent engine stop, IMAP is intake manifold absolute pressure at intake valve closing time of the next cylinder, EMAP is exhaust manifold absolute pressure at exhaust valve closing time of the next cylinder, CR1 is cylinder internal residuals (e.g., exhaust gas), CRE is cylinder exhaust residuals due to external exhaust gas recirculation, and Mfi is the mass of fuel to be injected during the intake stroke of the next cylinder selected to fire or combust. Cylinder temperature may be inferred from intake air temperature and engine coolant temperature. Pressure in the next cylinder to fire or combust air and fuel since the most recent engine stop is determined via the cylinder pressure sensor after the intake valve of the next cylinder to fire after the most recent engine stop closes. The Method 300 proceeds to 346.

At 346, method 300 delivers makeup fuel to the next cylinder selected to fire (e.g., fuel that provides the desired fuel-air ratio (FAR) in the cylinder. In particular, method 300 delivers a portion of fuel to be delivered to the next cylinder to fire during the cycle of the next cylinder to fire based on the cylinder air charge amount determined at 344 and the desired air-fuel ratio for the engine. In one example, method 300 determines the amount of fuel to inject to the next cylinder to fire since the most recent engine stop via the following equation:

$$Mfc = ((Mac-Mai) \cdot FAR) + ((Mai \cdot FAR) \cdot (1-DISFF))$$

where Mfc is the mass of fuel to be injected during the compression stroke of the next cylinder selected to fire, Mac is mass of air in the next cylinder selected to fire as determined via cylinder pressure, Mai is the mass of air in the cylinder as determined during the intake stroke of the next cylinder selected to fire, FAR is a desired fuel air ratio (e.g., 1:15), and DISFF is a desired fuel fraction for the intake stroke. Injecting the balance of fuel for the next combustion event of the engine during the compression stroke of the next cylinder selected to fire since a most recent engine stop allows the injected fuel amount to be corrected while still allowing larger amounts of fuel to enter the engine cylinder since cylinder air charge values may be high during engine starting. Method 300 proceeds to 348.

At 348, method 300 discharges spark in the next cylinder to fire since the most recent engine stop. The spark timing is adjusted as a function of the cylinder air charge determined from pressure in the next cylinder to fire. For example, spark timing may be determined via the following equation:

$$SAF = f(N, Mac)$$

where SAF is the spark timing, N is engine speed, and Mac is the cylinder air charge in the next cylinder to fire. Note that in some examples, a cylinder load value based on Mac may be substituted for Mac. Method 300 also updates the next cylinder to fire. Method 300 proceeds to 350.

At 350, method 300 judges if an engine shutdown is requested. An engine may be shutdown in response to a request from a human driver, an autonomous driver, or a start/stop engine controller. If method judges that and engine shutdown is requested, the answer is yes and method 300 proceeds to 352. Otherwise, the answer is no and method 300 returns to 340.

At 352, method 300 ceases fuel and spark delivery to engine cylinders to stop engine rotation. Method 300 proceeds to exit.

In this way, cylinder air charge values may be adjusted responsive to the first engine cylinder to fire since a most recent engine stop and an actual total number of combustion events since the most recent engine stop. The fuel injected to the engine cylinders may be adjusted responsive to engine cylinder air charge estimates.

Thus, the method of FIGS. 3-5 provides for an engine operating method, comprising: injecting a first amount of fuel to a cylinder during the cycle of the cylinder in response to an open loop estimate of cylinder air charge, the open loop estimate of cylinder air charge a function of a first cylinder to fire since a most recent engine stop and an actual total number of combustion events since the most recent engine stop. The method further comprises injecting a second amount of fuel to the cylinder during the cycle of the cylinder in response to a cylinder pressure. The method includes where the first amount of fuel is injected during an intake stroke of the cylinder. The method includes where the second amount of fuel is injected during a compression stroke of the cylinder. The method includes where the open loop estimate of cylinder air charge is further based on intake manifold pressure. The method includes where engine rotational speed is zero during the most recent engine stop. The method includes where the first amount of fuel is injected via a direct fuel injector.

The method of FIGS. 3-5 also provides for an engine operating method, comprising: injecting a first amount of fuel to a cylinder during a cycle of the cylinder in response to a first cylinder air charge estimate, the first cylinder air charge estimate based on a scalar, the scalar a function of a first cylinder to fire since a most recent engine stop and an actual total number of combustion events since the most recent engine stop; and adjusting the scalar in response to a second cylinder air charge estimate. The method includes where the second cylinder air charge estimate is further based on a pressure in the cylinder during the cycle of the cylinder. The method further comprises storing the adjusted scalar to controller memory based on the first cylinder to fire since the most recent engine stop and the actual total number of combustion events since the most recent engine stop. The method further comprises injecting a second amount of fuel to the cylinder during the cycle of the cylinder in response to the pressure in the cylinder. The method includes where the first cylinder air charge estimate is further based on intake manifold pressure. The method further comprises adjusting spark timing in response to the pressure in the cylinder. The method includes where the cylinder is a second cylinder to fire since the most recent engine stop, and further comprising: adjusting a second fuel amount injected to the cylinder during the cycle of the cylinder based on exhaust pressure.

Referring now to FIG. 6, cylinder air charge values and fuel injection amounts for two engine starts is shown. The sequence of FIG. 6 may be provided via the system of FIG. 1 and the method of FIGS. 3-5. In this example, cylinder number one of a four cylinder engine is a first cylinder to host combustion since a most recent engine stop in both engine start sequences. The vertical lines at t0-t7 represent times of interest during the sequence. The double SS along the horizontal axis represent breaks in time and the duration of the break in time may be long or short. The four plots of FIG. 6 are aligned in time. The first engine start begins just after time t0 and the second engine start begins just after time t4.

The first plot from the top of FIG. 6 is a plot of a cylinder air charge scalar ($\alpha$) for a first combustion event in cylinder number one since a most recent engine stop for cylinder number one being the first cylinder to fire since the most recent engine stop. The vertical axis represents the cylinder air charge scalar $\alpha$ value, and the value of $\alpha$ increases in the direction of the vertical axis arrow. The horizontal axis represents cylinder stroke of cylinder number one. The intake stroke of cylinder number one is indicated by "intake," the compression stroke is indicated by "compression," and so on. The engine rotates in a direction from the left side of FIG. 6 to the right side of FIG. 6. Trace 602 represents the scalar $\alpha$.

The second plot from the top of FIG. 6 is a plot of a cylinder air charge estimate based on or determined from intake manifold pressure and the $\alpha$ scalar as is described at 316 of FIG. 3. The vertical axis represents the cylinder air charge, and the cylinder air charge value increases in the direction of the vertical axis arrow. The horizontal axis represents cylinder stroke of cylinder number one. The engine rotates in a direction from the left side of FIG. 6 to the right side of FIG. 6. Trace 604 represents the cylinder air charge estimate that is based on intake manifold pressure.

The third plot from the top of FIG. 6 is a plot of a cylinder air charge estimate based on or determined from pressure in cylinder number one as is described at 320 of FIG. 4. The vertical axis represents the cylinder air charge, and the cylinder air charge value increases in the direction of the vertical axis arrow. The horizontal axis represents cylinder stroke of cylinder number one. The engine rotates in a direction from the left side of FIG. 6 to the right side of FIG. 6. Trace 606 represents the cylinder air charge estimate that is based on in cylinder pressure.

The fourth plot from the top of FIG. 6 is a plot of fuel injected into cylinder number one. The vertical axis represents when fuel is injected to cylinder number one. The length of fuel pulses 608-614 indicates the amount of fuel injected during each injection. Longer pulses indicate that a larger amount of fuel is injected to cylinder number one as compared to the smaller pulses. The horizontal axis represents cylinder stroke of cylinder number one. The engine rotates in a direction from the left side of FIG. 6 to the right side of FIG. 6. Traces 608-614 represents fuel pulses delivered to cylinder number one.

At time t0, the engine is not rotating. Engine rotation begins shortly after time t0 and the $\alpha$ scalar is a middle level value. The cylinder air charge estimate based on intake manifold pressure increases after intake manifold pressure is sampled. The intake manifold pressure (not shown) is at a higher level indicating ambient pressure. The cylinder air charge estimate that is based on cylinder pressure is not provided since cylinder number one is on its intake stroke.

At time t1, fuel begins to be injected to cylinder number one during its intake stroke and the amount of fuel injected to cylinder number one is a function of the cylinder air charge of cylinder number one as determined from engine intake manifold pressure and the value of scalar $\alpha$. By injecting fuel during the intake stroke, larger amounts of fuel may be injected during a cylinder cycle. Further, fuel vaporization may improve in some instances. The values of the scalar $\alpha$ and the cylinder air charge that is estimated based on engine intake manifold pressure have not changed. The value of the cylinder air charge estimate that is based on cylinder pressure is not indicated.

Between time t1 and time t2, the engine rotates through cylinder number one's intake stroke and into the compression stroke of cylinder number one. The values of the cylinder air charge that is estimated based on engine intake manifold pressure and cylinder air charge that is estimated based on pressure in cylinder number one are not changed.

At time t2, pressure in cylinder number one is determined after the intake valve of cylinder number one closes (not shown). The cylinder air charge that is estimated based on pressure in cylinder number one increases to a middle level value, but it is lower than the cylinder air charge amount in cylinder number one that is estimated based on engine intake manifold pressure. Fuel is not injected to the engine at time t2.

At time t3, a second fuel pulse is delivered to cylinder one during the same cylinder cycle as when fuel was injected at time t2. The amount of fuel injected at time t3 is based on the desired fuel fraction for the intake stroke and the difference in the cylinder air charge amount in cylinder number one that is estimated based on engine intake manifold pressure and the cylinder air charge that is estimated based on pressure in cylinder number one after intake valve closing of cylinder number one. The second fuel pulse allows the air-fuel ratio of cylinder number one to match a desired cylinder air-fuel ratio for cylinder number one. The scalar $\alpha$ value, the cylinder air charge in cylinder number one that is based on engine intake manifold pressure, and the cylinder air charge in cylinder number one that is based on pressure in cylinder number one after the intake valves of cylinder number one close remain at their previous values. The engine is stopped between time t3 and time t4 (not shown).

At time t4, the engine is not rotating. Engine rotation begins shortly after time t4. The $\alpha$ scalar is a middle level value, but it is lower than the $\alpha$ value at time t1 because the $\alpha$ value at time t4 has been updated based on the cylinder air charge estimate determined at time t2 that was based on pressure in cylinder number one after intake valve closing in cylinder number one. Thus, the value of scalar $\alpha$ at time t4 is updated to a lower level since the cylinder air charge determined from engine intake manifold pressure at time t1 was greater than cylinder air charge determined from pressure in cylinder number one at time t2. The cylinder air charge estimate that is based on intake manifold pressure at time t4 is lower than the cylinder air charge estimate that was based on intake manifold pressure at time t1, even though intake manifold pressure at time t1 and time t2 is equal (not shown), because the value of scalar $\alpha$ has been reduced. The cylinder air charge estimate that is based on cylinder pressure is not provided since cylinder number one is on its intake stroke.

At time t5, fuel begins to be injected to cylinder number one during its intake stroke and the amount of fuel injected to cylinder number one is a function of cylinder air charge determined from the engine intake manifold pressure and the value of scalar $\alpha$ at time t4. By injecting fuel during the intake stroke, larger amounts of fuel may be injected during a cylinder cycle. Further, fuel vaporization may improve in some instances. The values of the scalar $\alpha$ and the cylinder air charge that is estimated based on engine intake manifold pressure have not changed since time t4. The value of the cylinder air charge estimate that is based on cylinder pressure is not indicated. The amount of fuel injected at time t5 is less than the amount of fuel that was injected at time t1 because the cylinder air charge estimate that is based on intake manifold pressure at time t4 has been reduced by the revised $\alpha$ value.

Between time t5 and time t6, the engine rotates through cylinder number one's intake stroke and into the compression stroke of cylinder number one. The values of the cylinder air charge that is estimated based on engine intake manifold pressure and cylinder air charge that is estimated based on pressure in cylinder number one are not changed.

At time t6, pressure in cylinder number one is determined after the intake valve of cylinder number one closes. The cylinder air charge that is estimated based on pressure in cylinder number one increases to a middle level value, and it is it is nearly equal to the cylinder air charge amount in cylinder number one that is estimated based on engine intake manifold pressure. Fuel is not injected to the engine at time t2.

At time t7, a second fuel pulse is delivered to cylinder one during the same cylinder cycle as when fuel was injected at time t5. The amount of fuel injected at time t7 is based on desired fuel fraction for the intake stroke DISFF as discussed in the description of method 300. The second fuel pulse allows the air-fuel ratio of cylinder number one to match a desired cylinder air-fuel ratio for cylinder number one. The scalar $\alpha$ value, the cylinder air charge in cylinder number one that is based on engine intake manifold pressure, and the cylinder air charge in cylinder number one that is based on pressure in cylinder number one after the intake valves of cylinder number one close remain at their previous values. The value of scalar $\alpha$ is not updated because the cylinder air charge in cylinder number one that is based on pressure in cylinder number one and the cylinder air charge in cylinder number one that is based on engine intake manifold pressure are close in value.

In this way, cylinder air charge estimates may be adjusted for engine operating conditions including a total number of combustion events since a most recent engine stop and a first engine cylinder to fire after a most recent engine stop.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
injecting a first amount of fuel to a cylinder during a cycle of the cylinder in response to an open loop estimate of a cylinder air charge, wherein the open loop estimate of the cylinder air charge is a function of a first cylinder to fire since a most recent engine stop and an actual total number of combustion events since the most recent engine stop.

2. The method of claim 1, further comprising injecting a second amount of fuel to the cylinder during the cycle of the cylinder in response to a cylinder pressure.

3. The method of claim 2, where the first amount of fuel is injected during an intake stroke of the cylinder.

4. The method of claim 3, where the second amount of fuel is injected during a compression stroke of the cylinder.

5. The method of claim 1, where the open loop estimate of cylinder air charge is further based on intake manifold pressure.

6. The method of claim 1, where an engine rotational speed is zero during the most recent engine stop.

7. The method of claim 1, where the first amount of fuel is injected via a direct fuel injector.

8. An engine operating method, comprising:
injecting a first amount of fuel to a cylinder during a cycle of the cylinder in response to a first cylinder air charge estimate, the first cylinder air charge estimate based on a scalar, wherein the scalar is a function of a first cylinder to fire since a most recent engine stop and an actual total number of combustion events since the most recent engine stop; and
adjusting the scalar in response to a second cylinder air charge estimate for the cylinder.

9. The method of claim 8, where the second cylinder air charge estimate is further based on a pressure in the cylinder during the cycle of the cylinder.

10. The method of claim 9, further comprising storing the adjusted scalar to controller memory based on the first cylinder to fire since the most recent engine stop and the actual total number of combustion events since the most recent engine stop.

11. The method of claim 10, further comprising injecting a second amount of fuel to the cylinder during the cycle of the cylinder in response to the pressure in the cylinder.

12. The method of claim 11, where the first cylinder air charge estimate is further based on intake manifold pressure.

13. The method of claim 11, further comprising adjusting spark timing in response to the pressure in the cylinder.

14. The method of claim 8, where the cylinder is a second cylinder to fire since the most recent engine stop, and further comprising:
adjusting a second amount of fuel injected to the cylinder during the cycle of the cylinder based on exhaust pressure.

* * * * *